R. K. GOAR.
BOLL WEEVIL EXTERMINATOR.
APPLICATION FILED JAN. 13, 1917.
1,228,313.
Patented May 29, 1917.
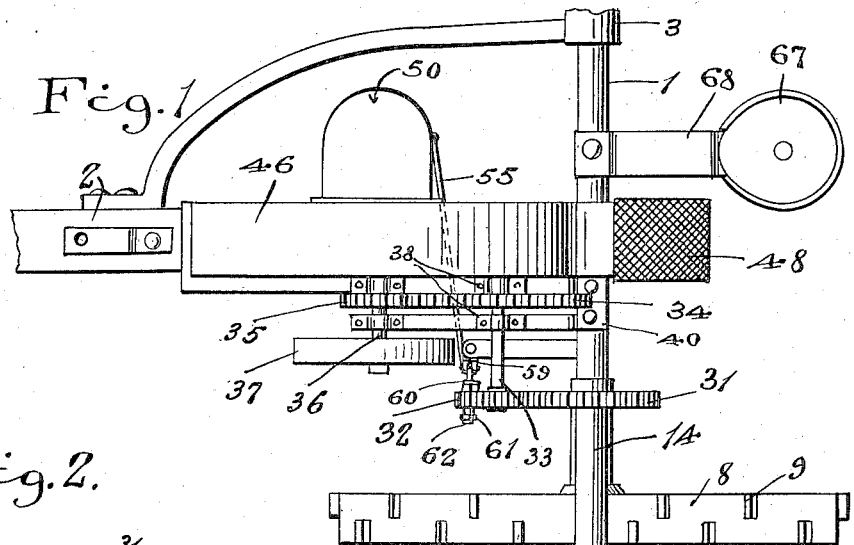
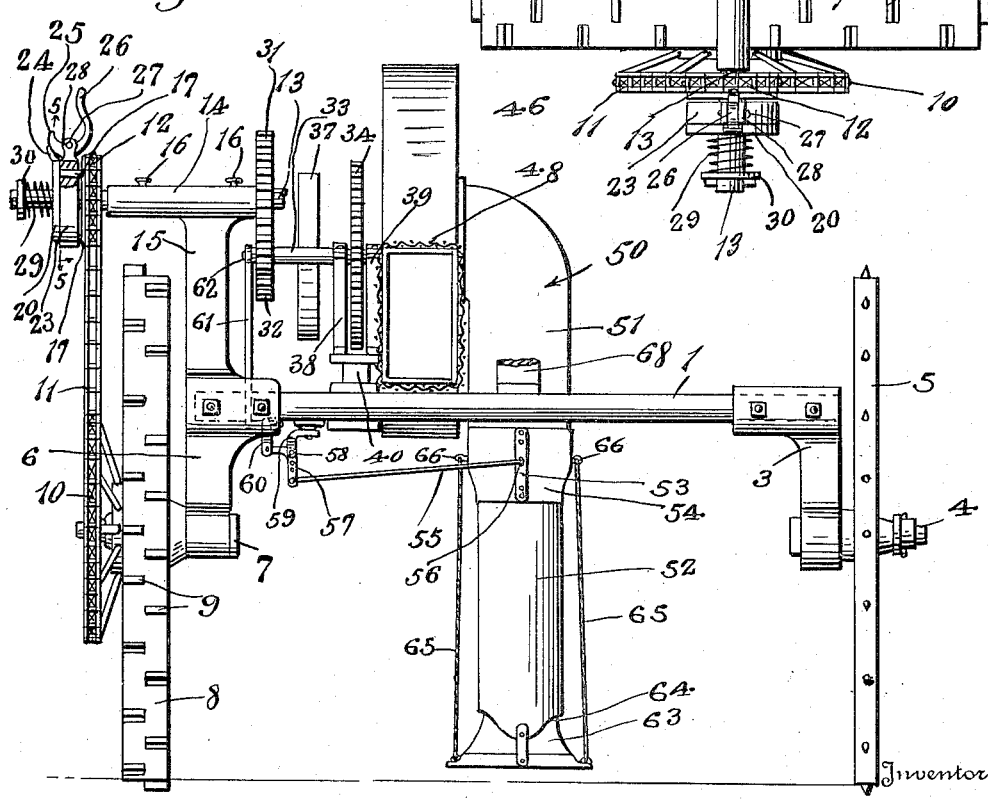
Witnesses
Inventor
R. K. Goar.

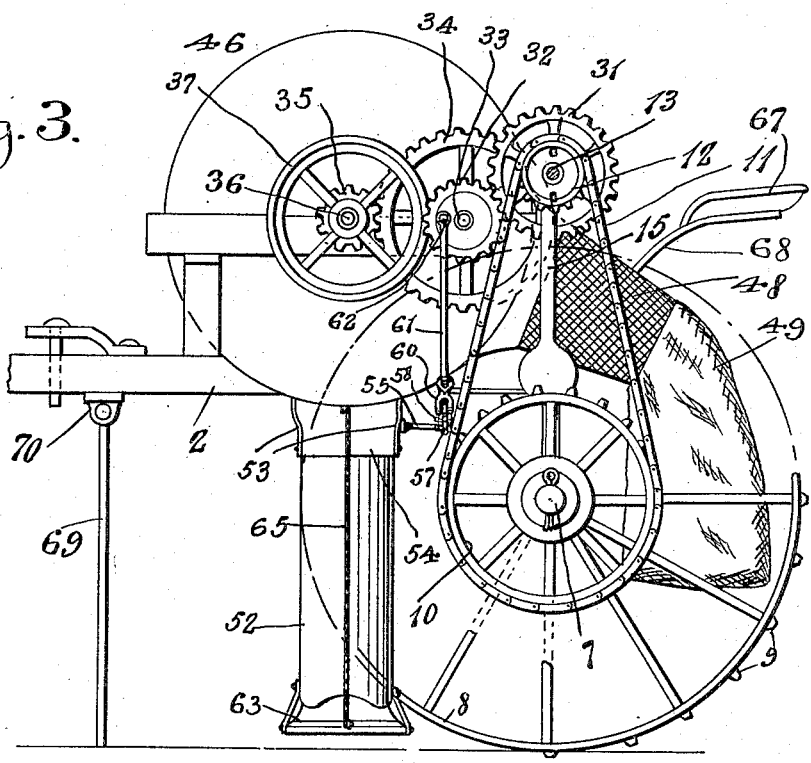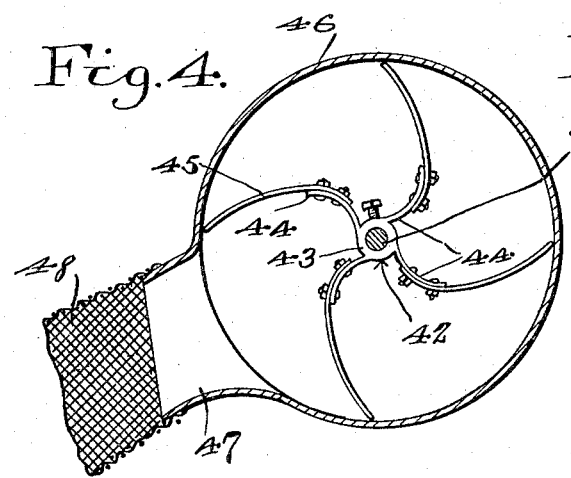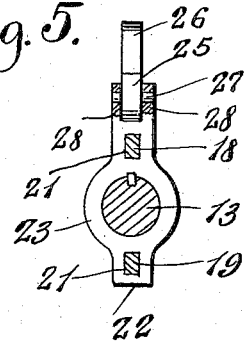

UNITED STATES PATENT OFFICE.

ROBERT K. GOAR, OF HAMILTON, TEXAS.

BOLL-WEEVIL EXTERMINATOR.

1,228,313.    Specification of Letters Patent.    Patented May 29, 1917.

Application filed January 13, 1917. Serial No. 142,178.

*To all whom it may concern:*

Be it known that I, ROBERT KEITH GOAR, a citizen of the United States, residing at Hamilton, in the county of Hamilton and State of Texas, have invented certain new and useful Improvements in Boll - Weevil Exterminators; and I do hereby declare the following to be a full, clear, and exact description of the invention, such as will enable others skilled in the art to which it appertains to make and use the same.

This invention relates to a machine which is particularly designed for destroying boll weevils or other insects which infest cotton plants and the primary object of the invention is to provide a machine of this nature, of the air suction type wherein the suction fan is operated, by the travel of the machine, through the medium of a plurality of gears, pinions and sprocket and chains for providing the proper speed of rotation of the fan for creating the desired suction.

Another object of this invention is to provide a nozzle, which has communication with the air inlet of the fan of the machine and has a lower section connected thereto by suitable flexible means, and to provide means which are operated by the travel of the machine for automatically swinging the nozzle laterally across two rows of growing cotton plants and further to provide a hood which is pivotally connected to the mouth of the nozzle so that it will remain in a horizontal position during the lateral swinging movement of the nozzle.

A further object of this invention is to provide a foraminous nozzle for the outlet of the fan, to which foraminous nozzle a shank or suitable receptacle may be connected, for receiving the weevils or other insects from the fan, which foraminous nozzle is provided for permitting the escape of the air.

A still further object of this invention is to provide a novel clutch structure, which includes a sprocket having a clutch section formed upon one side of the same, a member which is keyed to a shaft, and a second member which is slidably mounted upon the shaft and is provided with a pair of pins, which extend through the member that is keyed upon the shaft and are adapted for engagement with the clutch section carried by the sprocket and further to provide means for moving the pins out of engagement with the clutch section carried by the sprocket.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a top plan view of the improved boll weevil exterminator.

Fig. 2 is a rear elevation of the exterminator.

Fig. 3 is a side elevation having parts broken away.

Fig. 4 is a vertical section through the fan, and

Fig. 5 is a section on the line 5—5 of Fig. 2.

Referring more particularly to the drawings, 1 designates the main supporting axle of the boll weevil exterminator which has a tongue 2 attached thereto in any suitable manner. The axle 1 has a bearing hanger 3 attached to one end of the same, the lower end of which forms a bearing for the axle or spindle 4 upon which the supporting wheel 5 of the exterminator is mounted.

A bearing hanger 6 is attached to the end of the axle oppositely from the bearing hanger 3 and its lower end forms a bearing for the axle 7 upon which the main supporting and drive wheel 8 of the boll weevil exterminator is rotatably mounted. The wheel 8, has grouters or cleats as indicated at 9 spaced about its periphery for preventing slipping of the wheel during rotation. The wheel 8 has a sprocket 10 attached to one side of the same. A sprocket chain 11 passes about the sprocket 10 and about a sprocket 12 which is mounted upon a shaft 13. The shaft 13 is rotatably supported by a bearing 14 which is mounted upon the upper end of a casting 15 which is attached to the axle 1 in any suitable manner. Suitable oil cups 16 are provided for lubricating the bearing 14.

The sprocket 12 is loosely mounted upon the axle 13 and it has clutch teeth 17 formed upon one side of the same which are adapted to be engaged by the ends of pins 18 and 19. The pins 18 and 19 are carried by a member 20 which is also slidably mounted upon the shaft 13. The pins 18 and 19 extend through openings 21 which are formed in the diametrically opposed arms 22 that are formed upon a casting 23 which casting is keyed upon the shaft 13, so that when the pins 18 and 19 are forced through the castings 23 into engagement with the clutch teeth 17, the shaft 13 will be rotated by the rotation of the drive wheel 9.

The casting has an upstanding ear 24 formed thereon which is engaged by the short end 25 of a pivotally mounted lever 26. The lever 26 is pivotally mounted as shown at 27, to ears 28 which are formed upon and extend upwardly from the upper ear 22 of the casting 23. When the lever 26 is moved to the left, of Fig. 2, it will force the pins 18 and 19 out of engagement with the clutch teeth 17 and permit the sprocket 12 to rotate idly upon the shaft 13. A spiral spring 29 engages the member 20 and normally holds the pins 18 and 19 in engagement with the teeth 17. A washer 30 is mounted upon the shaft 13 and the end of the spring 29 which is free from connection with the member 20 engages this washer.

A gear 31 is mounted upon the shaft 13 and it meshes with a pinion 32 which is carried by a shaft 33. A gear 34 is mounted upon the shaft 33 and it meshes with a pinion 35 which is mounted upon the fan shaft 36. A fly wheel 37 is also mounted upon the fan shaft 36. The shafts 33 and 36 are supported by suitable bearings 38 and 39 which are supported by a casting 40 which casting is in turn carried by the axle 1.

The fan shaft 36 has the fan hub 42 mounted thereon which comprises a sleeve 43 and a plurality of arcuate radiating arms 44, to which are secured the fan blades 45. The fan casing 46 has an outlet spout 47 formed thereon to which is attached a foraminous spout 48. The foraminous spout 48 is adapted to have a sack or analogous receptacle as indicated at 49 attached thereto for receiving the weevils, or other insects.

A nozzle structure 50 is attached to the fan casing and communicates with the fan inlet. The nozzle structure 50 comprises an upper pipe 51, to which a lower pipe 52 is attached by means of strap irons 53 which strap irons are pivotally connected to the upper section 51 of the nozzle 50. A canvas or other suitable fabric connection 54 is attached to the upper section 50 and the lower section 52, for forming a practically airtight joint between the two and to permit the lower section 52 to swing independently of movement of the upper section 51.

A rod 55 is connected to the straps 53 as is shown at 56. The rod 55 is connected to a bell crank 57, which is pivotally supported as shown at 58 by a bracket 59. The bell crank 58 has a casting 60 connected thereto to which casting a rod 61 is connected. The rod 61 is connected to a pin 62, which pin is eccentrically connected to the gear or pinion 32 for reciprocating the rod 61 upon rotation of the pinion which reciprocatory movement will be imparted to the rod 55 through the medium of the bell crank 57 for swinging the lower nozzle section 52 laterally across a row of growing plants, during the travel of the boll weevil exterminator.

The section 52 has a hood 63 connected thereto through the medium of links 64, so that the hood will remain in a horizontal position, during the movement of the section 52 laterally across a row of plants. The hood 63 has an upwardly extending portion which projects into the lower end of the lower section 52.

Cords 65 are connected to the nozzle 63 and to the eye bolts 66 which are carried by the upper section 51, for holding the nozzle 63 in a horizontal position, during the lateral movement of the section 51.

A seat 67 of the usual construction, is supported by the usual type of spring standard 68. The tongue 2 has a substantially U-shaped rod 69 pivotally connected to its under surface as shown at 17, which rod is adapted for resting upon the ground and supporting the tongue 2 when the machine is not in use.

In the operation of the improved boll weevil exterminator, the movement of the machine over a field, will, when the pins 18 and 19 engage the clutch teeth 17, rotate the shaft 13, and consequently rotate the fan structure, creating an air suction. The air suction created by the fan through the nozzle 50 will draw the boll weevil or other insects upwardly into the fan casing 46 from whence they will be ejected through the nozzles 47 and 48 into the retainer 49. The boll weevil exterminator is constructed, for operating upon two rows of cotton at a time, and the tongue 2 is disposed at one side of the machine to allow the draft animals to walk upon the opposite sides of one row. This eliminates side draft and allows the lower section 52 of the nozzle to move laterally across the middle between the two rows of cotton, and draw the boll weevils and other insects as well as the insects and squares from the plants in both rows. The nozzle section 52 is operated by the operation of the gear 32 as previously described.

From the foregoing description taken in connection with the accompanying drawings, the advantages of construction and of the method of operation of the improved boll weevil exterminator will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a boll weevil exterminator, a suction nozzle structure including a flexible section and a lower nozzle section, means connected to said nozzle structure for swinging the lower nozzle section laterally of a row, a hood pivotally connected to the lower end of the lower nozzle section, and means connected to said hood and said nozzle section for holding said hood in a horizontal position during the swinging movement of said nozzle.

2. In a boll weevil exterminator, the combination, of a supporting structure, a rotary air suction fan, a nozzle connected to the inlet of said fan, said nozzle being composed of a rigid upper section and a lower section, flexible means connecting said lower section to said upper rigid section, and means operatively connected to said lower section for swinging the lower section laterally of a row of plants during the travel of the exterminator, a hood pivotally connected to the lower ends of said lower nozzle section and means for holding said hood in a horizontal position during the swinging movement of the lower nozzle section.

In testimony whereof I affix my signature in presence of two witnesses.

ROBERT K. GOAR.

Witnesses:
CAD C. LIVINGSTON,
T. M. RICHARDSON.

Copies of this patent may be obtained for five cents each, by addressing the "Commissioner of Patents, Washington, D. C."